INVENTOR
Leo W. Rose
BY
Ely & Barrow
ATTORNEYS.

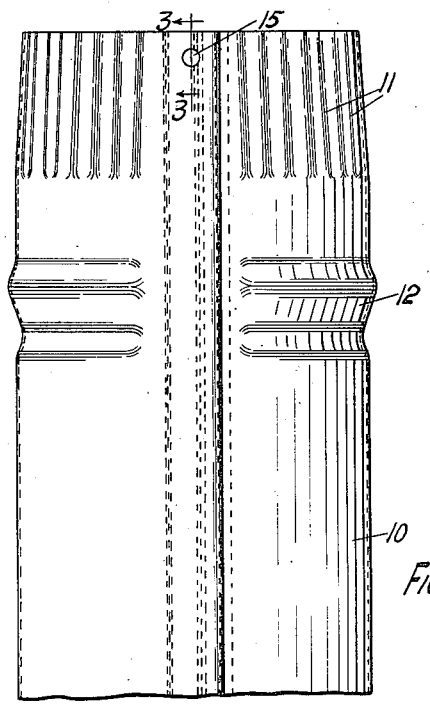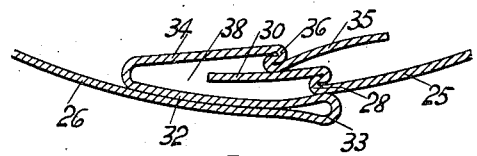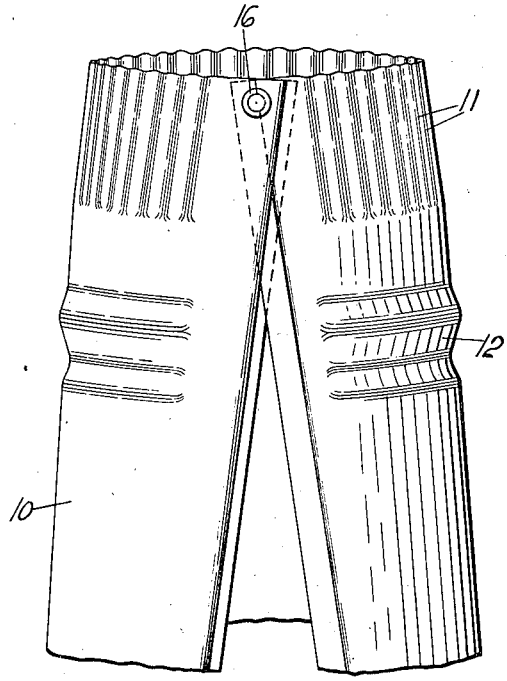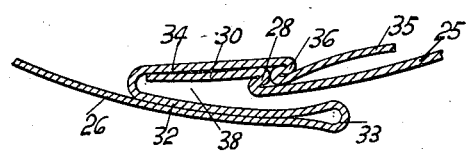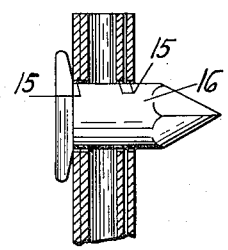

Patented May 28, 1929.

1,715,008

UNITED STATES PATENT OFFICE.

LEO W. ROSE, OF DOVER, OHIO, ASSIGNOR TO MILWAUKEE CORRUGATING COMPANY, OF MILWAUKEE, WISCONSIN, A CORPORATION OF WISCONSIN.

LOCK-JOINT-PIPE SEAM.

Application filed April 3, 1928. Serial No. 266,948.

This invention relates to sheet metal pipe, particularly to that class of pipe generally designated as stove pipe, which is made from sheet steel, although the invention is not necessarily limited to use on stove pipe. The form of pipe shown is of the type known as lock joint pipe, which is manufactured with interlocking formations along the edges of the pipe sections. By constructing pipe with the interlocking means, the pipe sections may be nested for shipment. When the pipe is to be put in place, the edges of the sections are brought together and locked by engagement of mating formations along the edges.

Interlocking joint pipe have been known and used with various connections. The object of the present invention is to simplify and improve upon the lock formations, as will be apparent to those skilled in this art. The lock joint shown and described herein is much simpler in construction and design than previous forms of lock joints. It cannot be easily bent, is secure and gives the desirable "snap" when it goes into place.

A further object of the invention is to improve upon the locking of the pipe. In all forms of lock joint pipe, it is necessary to bring the edges of the pipe into alignment along the whole pipe length before they can be locked. As the pipe lengths come in sections usually from twenty-four to thirty inches in length and are very difficult to handle, owing to the spring qualities of the sheet metal from which they are made, the locking of the edges is attended with great difficulties. The labor of getting the edges of the pipe length aligned and then snapping the joint together along the whole of the pipe length is tedious and exasperating. One of the objects of the invention is to provide means for assisting the assembly of the lock joint so that it can be done easily and quickly. This means consists primarily in the provision of a preliminary connection for one end of the pipe length, about which the pipe can be twisted or pivoted so as to bring the lock joints in alignment or register. This may be in the form of a temporary pivot, if desired, or the pivotal connection may be permanently formed in the pipe. Many different forms of such connection may be devised, and the showing in the present application is illustrative only.

It will also be appreciated that the invention in any of its aspects is not necessarily limited to exact conformity with the detailed showing herein, but may be varied or modified within the limits of the invention as defined by the prior art and by a fair interpretation of the appended claims. It is also apparent that the essential features of the invention may be embodied in various forms and that the showing of the several forms herein is not exhaustive.

In the drawings:

Figure 1 is a side view of a pipe section of the preferred form, locked together;

Figure 2 is a similar view showing the manner of bringing the locked edges into register for the locking operation;

Figure 3 is an enlarged section on the line 3—3 of Figure 1, showing a temporary pivot in place at the pipe end;

Figure 4 is an enlarged section of the preferred form of lock joint, showing the entering of the locking formations;

Figure 5 is a similar view showing the locking formations fully entered;

Figure 6:
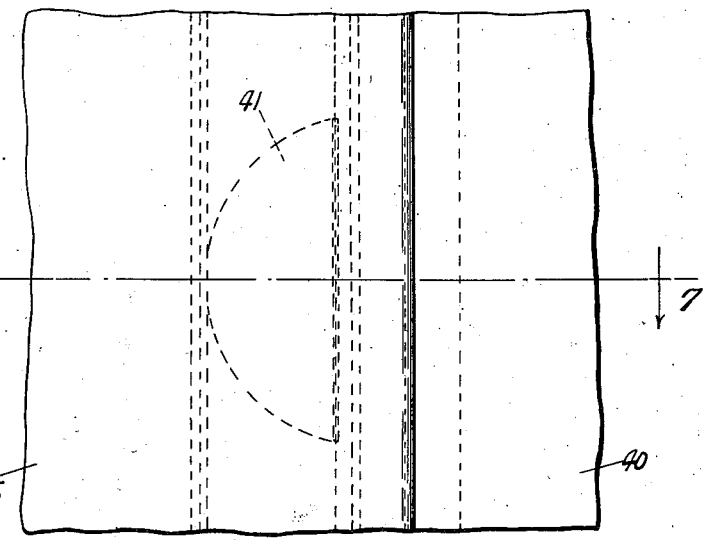
Figure 6 is a side view of a modified form of the lock joint.

A portion of a pipe section 10 is shown in Figure 1, the crimped end of the section being illustrated, it being understood that the improvement may be applied to the other end of the pipe, if desired, the crimped end being preferably shown, as the pivotal or temporary connection will be concealed when the pipe sections are assembled end to end. These pipe sections come in various sizes or lengths and are formed substantially in rounded or cylindrical form, without locking the edges, so that a number of sections can be nested for shipment or storage. This pipe end is shown with the usual crimping at 11 and fluting at 12, the fluting and crimping not extending to the edges of the sections.

In the preferred form of the invention, as shown in Figures 1 to 3, the edges of the pipe section are provided with holes 15 located near one end of the section, here illustrated at the crimped end for the reasons explained. In locking the edges of the sections, they are overlapped so that the holes are brought into register, and then a preliminary holding means is inserted. This may be any suitable device, a nail 16 being satisfactory for the purpose. As the end of the pipe section is held in the position shown in Figure 2, the edges of the pipe are brought together, pivoting upon the nail until the joint slips into place along the whole line of the pipe section. By the use of the described expedient, the edges of the pipe are sheared together along the whole length of the section and the mating locking formations snap into place quickly and easily. By the simple expedient which has been described, the difficulties formerly experienced with lock joint piping are eliminated and the joint is made rapidly and effectively. It will be apparent that any temporary holding means may be substituted for that shown and that the shape, size and location of the apertures are not essentially as shown, so long as a pivotal connection is provided about which the pipe edges may rock as the lock joints are brought together.

The particular form of lock joint, which is preferred and which is illustrated herein, is shown in Figures 4 and 5. It is easily manufactured, is inexpensive and operates with certainty, giving the desirable "snap" as it goes into locking position. It consists of a male and female member, the former being indicated at 25 and the latter at 26. The male member is provided with a double crimped roll 28, the cross section of which resembles the letter S in which the loops forming the roll are located on opposite sides of the sheet so that they project upwardly beyond the surface of the sheet on either side thereof. The edge of the male member extends beyond the double loop to provide a tongue 30.

The female member of the lock joint is provided with a reversely bent portion 32 which lies along the inner wall of the pipe edge for a distance sufficient to house the tongue 30 and the roll 28. The reversely bent portion of the female member is provided with an open loop 33 which is slightly compressible. The edge of the female member is again folded to form a spaced wall 34 which extends outwardly beyond the loop 33 to form a tongue 35. In the spaced wall 34 is provided a double roll 36 similar to the roll 28 on the male member. The female member, therefore, consists of three layers of metal, the outer layer being spaced to provide the pocket 38.

In connecting the lock joint, the tongue 30 is passed into the space or pocket 38 in the female member between the spaced walls 32 and 34. As the male member enters the female member, the mouth of the female member between the walls 32 and 34 is expanded by the double roll 28, as shown in Figure 4. When the roll 28 passes within the roll 36, it snaps in place behind the roll 36 and the pipe edges are securely interlocked. The spring qualities of the sheet metal pipe insure a positive interlocking as soon as the two rolled formations have passed one another on the inward movement of the male member. As the interlocking formation on the female member lies within the pocket 38, it is not subject to injury from handling or shipping.

Figure 7:
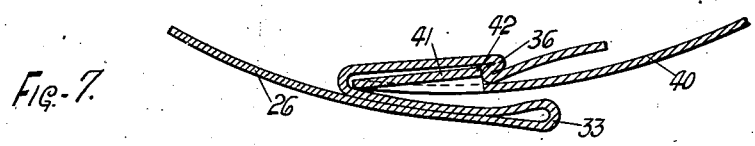
Figure 7 is a section thereof on the line 7—7 of Figure 6.
Figure 8:
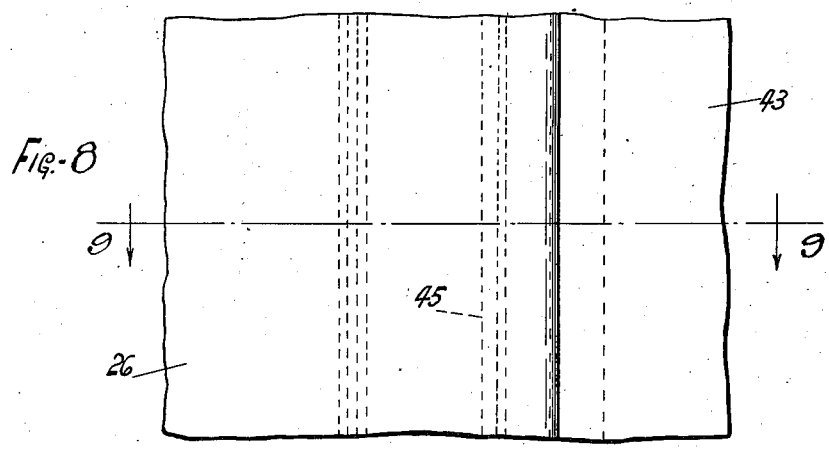
Figure 8 is a side view of a further modification.
Figure 9:
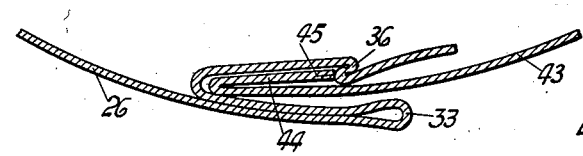
Figure 9 is a section thereof on the line 9—9 of Figure 8.

The male member may be modified, as shown in Figures 6 and 7, in which the male member 40 is provided with spaced tongues 41 one of which is shown in Figure 6 pressed upwardly at intervals along the male edge of the pipe, the vertical walls 42 of the tongues interlocking behind the double roll 36. A still further modification of the male member is shown in Figures 8 and 9, in which the male member 43 is formed with a continuous, reversely bent edge flange 44, the edge 45 of which interlocks behind the double roll 36.

It is possible that other changes and modifications may be made which will embody the principles of the invention as set forth in the claims, and the invention is not necessarily restricted to the exact embodiments shown and described herein.

What is claimed is:

1. An interlocking pipe seam comprising a male formation along one edge and an interlocking female formation along the other edge, the female formation comprising a reversely bent edge providing spaced walls enclosing a pocket opening at the edge of the pipe, and a rolled bead in the outer wall of the said pocket, the male formation having a portion projecting above the plane thereof and receivable within the pocket at the rear of the bead.

2. An interlocking pipe seam comprising a male formation along one edge and an interlocking female formation along the other edge, the female formation comprising a reversely bent edge providing spaced walls enclosing a pocket opening at the edge of the pipe, and a double rolled bead of S-form in the outer wall of the said pocket, the male formation having a portion projecting above the plane thereof and receivable within the pocket at the rear of the bead.

3. An interlocking pipe seam comprising a male formation along one edge and an interlocking female formation along the other edge, the female formation comprising a reversely bent edge providing spaced walls enclosing a pocket opening at the edge of the pipe, and a rolled bead in the outer wall of the said pocket, the male formation having a portion projecting above the plane thereof and receivable within the pocket at the rear of the bead, said bead being located within the pocket.

4. An interlocking pipe seam comprising a male formation along one edge and an interlocking female formation along the other edge, the female formation comprising a reversely bent edge providing spaced walls enclosing a pocket opening at the edge of the pipe, and a double rolled bead of S-form in the outer wall of the said pocket, the male formation having a portion projecting above the plane thereof and receivable within the pocket at the rear of the bead, said bead being located within the pocket.

5. An interlocking pipe seam comprising a male member and a female member, the former having a portion thereof projecting above its plane to provide an interlocking formation and the latter having a pocket therein formed by bending the metal of the pipe upon itself to form two spaced walls, and an interlocking formation extending along one of the walls consisting of a double crimped roll in substantially S-form.

6. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof.

7. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, said formation comprising a double rolled bead formed by crimping the metal of one of the walls upon itself.

8. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, said formation comprising a double rolled bead formed by crimping the metal of the outer layer of one of the walls upon itself.

9. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, the male edge having a tongue and an interlocking formation on the tongue receivable within the pocket at the rear of the interlocking formation on the female member.

10. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, said formation comprising a double rolled bead formed by crimping the metal of one of the walls upon itself, the male edge having a tongue and an interlocking formation on the tongue receivable within the pocket at the rear of the interlocking formation on the female member.

11. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, said formation comprising a double rolled bead formed by crimping the metal of the outer layer of one of the walls upon itself, the male edge having a tongue and an interlocking formation on the tongue receivable within the pocket at the rear of the interlocking formation on the female member.

12. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, the male edge having a tongue and an interlocking formation on the tongue similar to the interlocking formation on the female member receivable within the pocket at the rear of the interlocking formation on the female member.

13. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, said formation comprising a double rolled bead formed by crimping the metal of one of the walls upon itself, the male edge having a tongue and an interlocking formation on the tongue similar to the interlocking formation on the female member receivable within the pocket at the rear of the interlocking formation on the female member.

14. An interlocking pipe seam having a male and a female edge, the female edge consisting of three layers of metal formed by bending the metal upon itself, the outer layer being spaced from its next adjacent layer to provide a pocket, and an interlocking formation extending the entire length of the pocket and located within the mouth thereof, said formation comprising a double rolled bead formed by crimping the metal of the outer layer of one of the walls upon itself, the male edge having a tongue and an interlocking formation on the tongue similar to the interlocking formation on the female member receivable within the pocket at the rear of the interlocking formation on the female member.

LEO W. ROSE.